United States Patent
Hallemeier et al.

(10) Patent No.: US 6,198,855 B1
(45) Date of Patent: Mar. 6, 2001

(54) VELOCITY-MATCHED, TRAVELING-WAVE ELECTRO-OPTICAL DEVICES USING NON-CONDUCTIVE AND CONDUCTIVE POLYMER BUFFER LAYERS

(75) Inventors: Peter Hallemeier, Meriden; Alfredo Yi-Yan, East Granby; Chris Hussell, Weatogue; Karl Kissa, Simsbury, all of CT (US); Jack Lin, Scottsdale, AZ (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/400,130

(22) Filed: Sep. 21, 1999

Related U.S. Application Data

(63) Continuation-in-part of application No. 09/293,022, filed on Apr. 16, 1999, which is a continuation-in-part of application No. 08/683,870, filed on Jul. 19, 1996, now Pat. No. 5,895,742.

(51) Int. Cl.[7] .................. G02B 6/00; G02F 1/01; G02F 1/035
(52) U.S. Cl. .................................................. 385/2
(58) Field of Search ................... 385/1, 2, 3, 4, 385/143, 14, 129; 359/350, 281, 322, 254, 256, 154, 325; 356/483, 5.14

(56) References Cited

U.S. PATENT DOCUMENTS

| | | | |
|---|---|---|---|
| 4,957,362 | * 9/1990 | Peterson | 356/5.14 |
| 5,303,079 | 4/1994 | Gnauck et al. | 359/188 |
| 5,388,170 | 2/1995 | Heismann et al. | 385/4 |
| 5,404,412 | 4/1995 | Seino et al. | 385/2 |
| 5,414,791 | 5/1995 | Ermer et al. | 385/143 |
| 5,455,876 | 10/1995 | Hopfer et al. | 385/2 |
| 5,473,711 | 12/1995 | Hakogi et al. | 385/14 |
| 5,598,490 | 1/1997 | Hakogi et al. | 385/14 |
| 5,640,267 | * 6/1997 | May et al. | 359/322 |
| 5,680,497 | 10/1997 | Seino et al. | 385/129 |
| 5,835,212 | 11/1998 | Kissa et al. | 356/345 |
| 5,956,171 | * 9/1999 | Dennis et al. | 359/281 |

FOREIGN PATENT DOCUMENTS

| | | | |
|---|---|---|---|
| 0813093 A1 | 12/1997 | (EP) | G02F/1/035 |
| 0819969 A3 | 9/1998 | (EP) | G02F/1/035 |
| 06075195 | 3/1994 | (JP) | G02F/1/035 |

OTHER PUBLICATIONS

R.A. Becker, "Traveling–Wave Electro–Optic Modulator with Maximum Bandwidth–Length Product" *Appl. Phys. Lett.* 45(11):1168–1170 (1984).

A.H. Gnauck et al., "Dispersion Penalty Reduction Using an Optical Modulator with Adjustable Chirp" *IEEE Photonics Tech. Lett.* 3(10):916–918 (1991).

C.P. Hussell et al., "High–Index Overlay for High Reflectance DBR Gratings in $LiNbO_3$ Channel Waveguides" *IEEE Photonics Tech. Lett.* 9(5):636–638 (1997).

I. Sawaki et al., "Thermally Stabilized Z–Cut TI:$LiNbO_3$ Waveguide Switch" *CLEO* #MF2 (1986).

* cited by examiner

*Primary Examiner*—Akm E. Ullah
(74) *Attorney, Agent, or Firm*—Law Office of Kurt Rauschenbach

(57) ABSTRACT

An electro-optic device such as a Mach-Zehnder interferometer that includes a lithium niobate substrate having an optical waveguide that is formed in an upper surface of the substrate is described. The device includes a polymer buffer layer formed on the upper surface of the substrate. The polymer may be non-conductive or conductive. An electrode is formed on an upper surface of the buffer layer and is positioned to receive an RF signal that induces an electrical field in the optical waveguide. A conductive charge bleed-off layer may be formed between the buffer layer and the electrode in order to bleed-off pyroelectric charge. A semiconductor charge bleed-off layer may be formed between the substrate and the buffer layer.

23 Claims, 7 Drawing Sheets

VELOCITY-MATCHED, TRAVELING-WAVE ELECTRO-OPTICAL DEVICES USING NON-CONDUCTIVE AND CONDUCTIVE POLYMER BUFFER LAYERS

RELATED APPLICATIONS

The application is a continuation-in-part of patent application Ser. No. 09/293,022, filed Apr. 16, 1999, which is a continuation-in-part of patent application Ser. No. 08/683,870, filed Jul. 19, 1996 now U.S. Pat. No. 5,895,742, the entire disclosure of which is incorporated herein by reference.

FIELD OF THE INVENTION

The present invention relates to optical devices and, more specifically, to optical devices which are manufactured with non-conductive and conductive polymers.

BACKGROUND OF THE INVENTION

Known fiber optic communications systems include a laser diode, a modulator and a photodetector diode. Modulators are either direct, modulating the optical wave as it is generated at the source, or external, modulating the optical wave after it has been generated. A problem with fiber optic communications systems is that the transmission distance is strongly dependent on the modulation fidelity. External modulation of lightwave signals is accomplished by adjusting a modulation chirp parameter to a substantially fixed value in a predetermined, controllable manner. This minimizes the transmission power penalty caused by chromatic dispersion in an optical fiber communication system.

External modulation is accomplished, for example, in a dual waveguide device wherein substantially identical input optical beams are supplied to the waveguides and wherein each waveguide is subject to its own individual, mutually exclusive control. Modulation signals are applied to each waveguide via the separate control. Moreover, control signals are applied to each waveguide for adjusting the modulation chirp parameter to a desired non-zero substantially fixed value.

An electro-optical modulator modulates the optical signal with an electromagnetic signal, preferably an RF signal. The RF signal interacts with the optical signal over a predetermined distance. The optical modulators slows the RF signal relative to the optical signal so that it takes the RF signal a longer period of time to travel the interaction distance. Therefore, the RF signal electric field, which modulates the optical signal, varies relative to the optical signal along the interaction distance. Since the RF signal does not act on the same portion of the optical signal throughout the interaction distance, the magnitude of modulation is reduced. The longer the interaction distance, the greater the reduction.

Typical high-speed electro-optical external modulators use a traveling-wave electrode structure. Such modulators have a microwave transmission line in the vicinity of the optical waveguide. A microwave signal and an optical signal co-propagate for a prescribed distance, thereby acquiring the required optical modulation. To prevent velocity mismatch between the microwave signal and the optical signal in a traveling wave modulator, a thick buffer layer is provided on a wafer to speed up the propagation of the microwave signal. Previously, a silicon dioxide ($SiO_2$) buffer layer was created through known techniques such as electron beam, sputtering, or chemical vapor deposition (CVD). The buffer layer may be planarized throughout the wafer or may be patterned with electrode structures.

Using a $SiO_2$ buffer layer has numerous disadvantages. Producing a $SiO_2$ buffer layer requires expensive capital equipment and very precise control of production parameters. For example, devices such as evaporators, sputtering machines, gas supply machines or CVD machines cost tens or hundreds of thousands of dollars. Furthermore, most of the time, the $SiO_2$ material has less oxygen than necessary and requires annealing to gain proper dielectric properties. During annealing, thermal expansion creates stress between the silicon dioxide layer and the optical waveguides. The waveguides can become non-uniformly stressed throughout the wafer and even disappear under certain conditions. In addition, $SiO_2$ is a porous material, and absorbs a few percent of moisture after a 24-hour boil.

For many applications, it is important that the performance of electro-optical modulators be very stable over time and through temperature changes. Some electro-optic modulators are sensitive to temperature changes. For example, lithium niobate ($LiNbO_3$) integrated optical devices made using Z-cut crystal orientation are particularly sensitive to temperature changes. The term Z-cut $LiNbO_3$ refers to $LiNbO_3$ that is cut perpendicular to the Z-crystallographic orientation. Such modulators are being used in high-speed telecommunications systems because they have relatively high modulation efficiency.

Z-cut $LiNbO_3$ is sensitive to temperature changes because the pyroelectric effect in $LiNbO_3$ creates mobile charge when temperature fluctuations occur in the substrate. The mobile charges can generate strong electric fields in Z-cut crystals during normal operation of the device. These electric fields are stronger in Z-cut than X-cut $LiNbO_3$ crystals. Such strong electric fields are problematic because they can change the operating (bias) point of an electro-optic modulator, such as a Mach-Zehnder Interferometer (MZI), by creating fields across the waveguides that do not match one another. In addition, these strong electric fields can cause time dependent or uncontrolled charge dissipation, which may result in a loss of transmitted data. These fields may also cause arcing, which may also result in a loss of transmitted data.

There are methods known in the art for bleeding off pyroelectric charge. For example, some prior art devices use a metal oxide or semiconductor layer that is formed on top of the device to bleed off pyroelectric charge. Both amorphous and polycrystalline-silicon (poly-Si) semiconductor layers have been used to bleed off pyroelectric charge. A diffusion suppressing layer is sometimes included to prevent the metal electrodes from diffusing into the semiconductor bleed-off layer. Other prior art devices use a conductive layer on the bottom of the device that is electrically connected with the ground electrodes to provide a discharge path. In these devices, charge accumulating on the hot electrode can find a path to ground through the driver or biasing electronics.

A problem associated with $LiNbO_3$ modulators is undesirable charge generation and charge redistribution that can occur when a bias voltage is applied to an electrical input of a $LiNbO_3$ Mach-Zehnder interferometric modulator. The bias voltage is used to control the operating point of Mach-Zehnder interferometer. The application of the bias voltage can cause the formation of mobile charges, either in the form of electron, holes, or ions. These mobile charges either counteract the effect of the applied voltage by establishing a positive DC drift, or enhance the applied bias voltage by establishing a negative DC drift. Positive drift is particularly problematic because the voltage required to maintain the bias condition will steadily increase ("runs away") causing a reset to occur, which will result in a loss of data.

There are methods known in the art for reducing DC drift caused by undesirable charge generation and charge redistribution. For example, some prior art devices reduce DC drift by using a $SiO_2$ buffer layer that includes at least one metal oxide. The introduction of metal oxide(s) in the buffer layer can enhance the long term negative DC drift, which offsets the undesirable positive DC drift.

The prior art techniques for reducing DC drift and for enhancing charge bleed off add significantly to the cost of manufacturing the device. For example, costly silicon dioxide ($SiO_2$) deposition systems must be used for many prior art techniques because high quality $SiO_2$ is required. The quality and composition of the $SiO_2$ layer is critical to minimizing bias drift because impurities in the layer affect charge mobility. Prior art techniques carefully control the resistivity of the buffer layer to minimize DC drift.

It would be advantageous to provide a method of manufacturing optical devices that is less expensive, less complex, and yielding higher quality optical devices than prior art methods. It would also be advantageous to provide an inexpensive method of manufacturing optical devices that reduces pyroelectric effects and undesirable charge generation and redistribution that can occur when a bias voltage is applied.

Benzocyclobutene (BCB) exhibits several advantages over materials such as $SiO_2$, which are conventionally used in integrated optical devices. BCB is a new class of organic dielectric materials commonly used in multichip module (MCM) technology. As a result of its common use in MCM applications, BCB is a well-known and well-understood material. BCB has lower dielectric loss, a lower dielectric constant, is subject to lower mechanical stress, and is much easier to process during production of integrated optical modulators. The simplicity of forming BCB buffer layers provides a significant advantage over conventional buffer materials. A liquid BCB solution is applied to a wafer cured in a nitrogen atmosphere and patterned with a photoresist or metal mask. No expensive deposition machines, such as CVD machines, are required.

Unfortunately, interface adhesion forces between BCB and thin metal film is poor, resulting in a weak bond between the BCB layer and the metal film layer in an optical device. Furthermore, a velocity matched modulator requires an extremely thin layer of BCB, which may be less than one micron. It would be advantageous to provide a method of manufacturing optical devices which uses BCB as a buffer layer. It would also be advantageous to provide a conductive BCB buffer layer that reduces pyroelectric effects and undesirable charge generation and redistribution that can occur when a bias voltage is applied.

SUMMARY OF THE INVENTION

An object of the present invention is to provide a method of manufacturing optical devices that is less expensive, less complex and that yields higher quality optical devices. Another object of the present invention is to provide a process for manufacturing optical devices with improved temperature stability. Another object of the present invention is to provide a process for manufacturing optical devices that reduced bias drift associated with the electric fields formed along the +Z and −Z faces of a Z-cut $LiNbO_3$ crystal. Another object of the present invention is to provide a process for manufacturing optical devices which uses BCB as a buffer layer.

Another object of the present invention is to provide an optical device that includes a discharge path for mobile charges which prevents strong electric fields from forming along the +Z and −Z faces of a Z-cut $LiNbO_3$ crystal as a result of both temperature changes and applied bias. Another object of the present invention is to provide an optical device that minimizes the bias drift associated with the electric fields formed along the +Z and −Z faces of a Z-cut $LiNbO_3$ crystal. Yet another object of the present invention is to provide an optical device that simultaneously reduces pyroelectric effects and undesirable charge generation and redistribution that can occur when a bias voltage is applied.

A principle discovery of the present invention is that a Z-cut $LiNbO_3$ optical modulator suitable for high-speed telecommunications applications can be constructed using a conductive polymer buffer layer and a separate conductive charge bleed-off layer that simultaneously reduces DC drift and bleeds off pyroelectric charge. Another principle discovery of the present invention is that a Z-cut $LiNbO_3$ optical modulator suitable for high-speed telecommunications applications can be constructed using a conductive polymer buffer layer and a semiconductive charge bleed-off layer that simultaneously reduces DC drift and bleeds off pyroelectric charge.

Accordingly, the present invention features an electro-optic device, such as a Mach-Zehnder interferometer, that includes a lithium niobate substrate having an optical waveguide that is formed in an upper surface of the substrate. In one embodiment of the invention, the lithium niobate substrate is cut perpendicular to the Z-axis (Z-cut lithium niobate). A buffer layer that comprises BCB dielectric material is formed directly on the upper surface of the lithium niobate substrate. In one embodiment, the buffer layer has a thickness that is less than two microns. The BCB layer may have a conductivity such that DC drift is reduced.

An electrode is formed on an upper surface of the buffer layer. The electrode is positioned to receive an RF signal that induces an electrical field in the optical waveguide. In one embodiment of the invention, an interface layer is formed between the buffer layer and the electrode in order to improve the adhesion of the electrode to the buffer layer. The interface layer may be formed by roughening an upper surface of the buffer layer. The electrode may be electroplated on top of a plating base. A plating base, such as a titanium/tungsten layer, may be formed directly on the buffer layer or the interface layer. The device may include a charge bleed-off layer that is formed between the buffer layer and the electrode in order to bleed off pyroelectric charge. The charge bleed-off layer may comprises a metal oxide film or a conductive polymer film.

The present invention also features an electro-optic device that simultaneously reduces DC drift and bleeds off pyroelectric charge. The device includes a Z-cut lithium niobate substrate having an optical waveguide that is formed in an upper surface of the substrate. A buffer layer that comprises BCB dielectric material may be formed directly on the upper surface of the lithium niobate substrate or on top of a conductive charge bleed-off layer. In one embodiment, the buffer layer has a thickness of less than two microns. The BCB layer may have a conductivity that reduces DC drift.

In one embodiment, a conductive charge bleed-off layer is formed on an upper surface of the buffer layer. The charge bleed-off layer may comprise a metal oxide film or a conductive polymer film. An electrode is formed on an upper surface of the charge bleed-off layer. The electrode is positioned to receive an RF signal that induces an electrical field in the optical waveguide.

The present invention also features another electro-optic device that simultaneously reduces DC drift and bleeds off pyroelectric charge. The device includes a Z-cut lithium niobate substrate having an optical waveguide that is formed in an upper surface of the substrate. A semiconductor charge bleed-off layer for bleeding off pyroelectric charge is formed directly on the upper surface of the Z-cut lithium niobate substrate. The semiconductor layer may be silicon.

A buffer layer that comprises BCB dielectric material is formed on an upper surface of the semiconductor charge bleed-off layer. In one embodiment, the buffer layer has a thickness of less than two microns. In one embodiment, the BCB layer has a conductivity that reduces DC drift. An electrode is formed on an upper surface of the buffer layer. The electrode is positioned to receive an RF signal that induces an electrical field in the optical waveguide.

DETAILED DESCRIPTION

Figure 1:
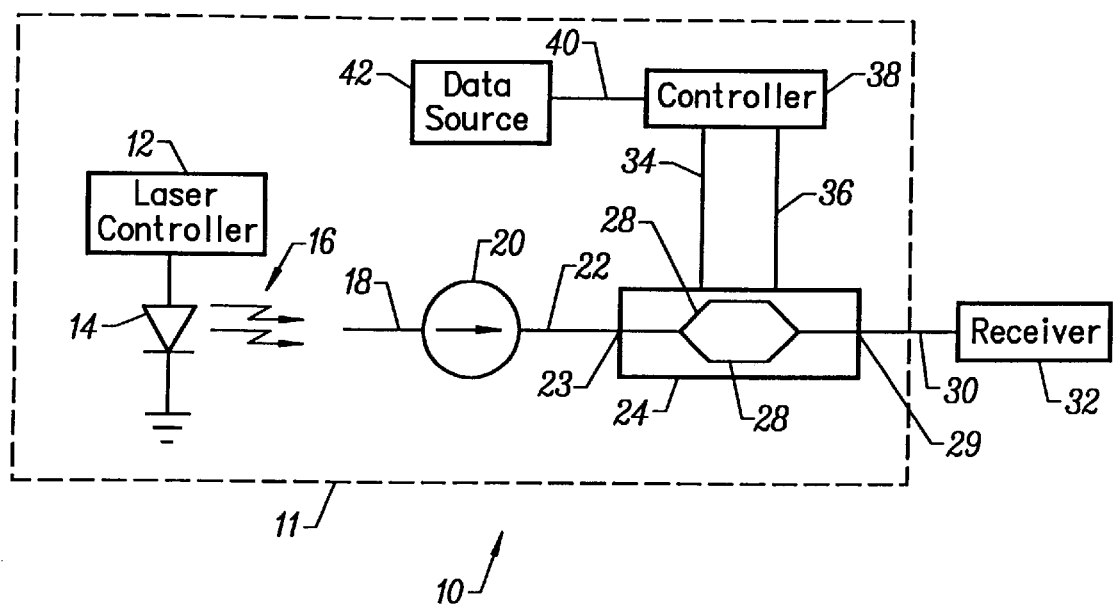
FIG. 1 is a simplified schematic diagram of an embodiment of an optical communication system.

FIG. 1 shows an embodiment of a simplified optical communication system 10 utilizing a modulator 24 of the present invention. The optical communication system 10 comprises a transmitter 11, a receiver 32 and a transmission medium 30, which connects the transmitter 11 to the receiver 32. The transmission medium 30 is typically an optical fiber.

The transmitter 11 includes a laser 14, which operates in accordance with laser control signals received from a laser controller 12. The laser 14, which may operate in continuous wave (CW) mode or pulsed mode, produces optical signals 16 having a prescribed wavelength. In long wavelength communications systems, the laser 14 is typically an InGaAsP/InP semiconductor single-mode laser which generates 1.5 micrometer wavelength optical signals.

A lensed optical fiber 18, or fiber pigtail, receives the optical signals 16. The lensed optical fiber 18 is coupled to the isolator 20, which reduces reflections directed towards the laser 14. In one embodiment, the isolator 20 is combined with a polarizer (not shown) to further reduce reflections to the laser 14. In another embodiment, the lensed optical fiber 18 is coupled directly to the modulator 24, rather than through the isolator 20.

An external modulator 24 receives the optical signals 16 from the laser 14 via an input fiber 22. The modulator 24 includes two waveguides 28 and 26. The controller 38 controls each waveguide 26, 28 independently of the other or with one control signal. The optical signals 16 are received at an input 23 of the modulator 24 and are modulated in each of the waveguides 28 and 26. Modulated optical signals from each of the waveguides 28 and 26 are combined into a modulated optical signal at an output 29 of the modulator 24. The modulator 24 may perform either amplitude modulation or phase modulation or some combination to "chirp" the light of the received optical signals 16. The combined, modulated optical signal is transmitted across the fiber 30 to the receiver 32.

The controller 38 receives digital data signals from a data source 42 via a transmission line 40, and generates modulation control signals in response to the received signals. The modulation control signals are introduced into the modulator 24 via leads 34 and 36. The modulation control signals are indicative of a predetermined modulation of the optical signals 16 and of desired modulation chirp parameters. For example, the modulation control signals are received by the modulator 24, and in response, the relative propagation velocities of each of the waveguides 28 and 26 changes to generate a desired modulation chirp parameter value. A single control signal may interact asymmetrically with waveguides 28 and 26 to produce a fixed amount of chirp.

One common modulator design is the Mach-Zehnder configuration. The operation of Mach-Zehnder modulators is described in detail in U.S. Pat. No. 5,455,876, which is owned by the assignee of the present application and incorporated herein by reference. A Mach-Zehnder modulator uses an interferometric technique in order to amplitude modulate the optical wave. A Mach-Zehnder modulator splits an incoming optical signal into two paths along optical waveguides and utilizes an electromagnetic signal, preferably a radio frequency (RF) signal, to modulate the split optical signals, which are in one or both optical waveguides. The two split optical signals are then combined into a single optical signal. Although the invention is described herein with a Mach-Zehnder modulator, the invention can be used with any type of electro-optical modulator.

Figure 2:
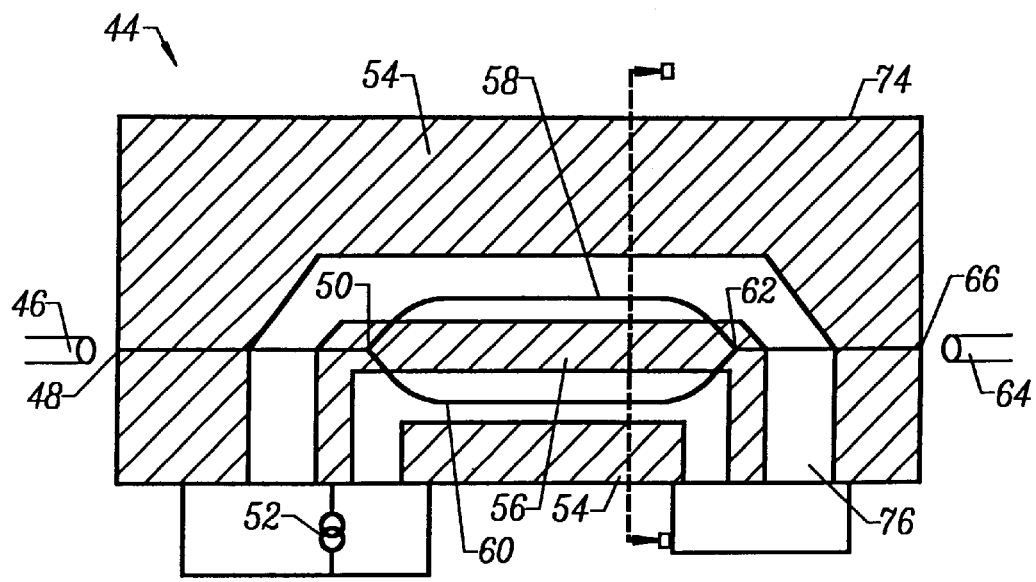
FIG. 2 is a top planar view of a modulator of the optical communication system of FIG. 1.
Figure 3:
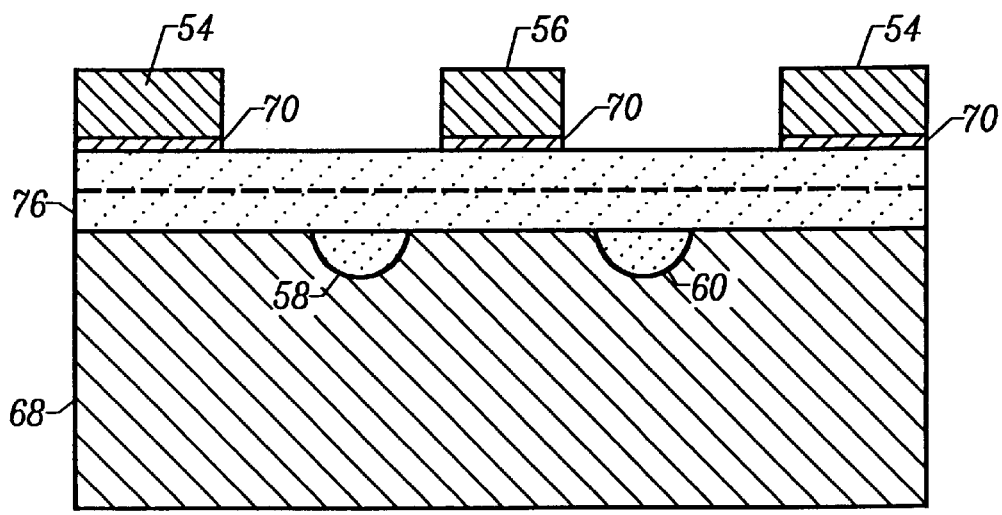
FIG. 3 is a cross-sectional view taken along line II—II of FIG. 2.

FIG. 2 illustrates a top planar view of a modulator of the optical communication system of FIG. 1. FIG. 3 illustrates a cross-sectional view taken along line II—II of FIG. 2. A fiber optic cable 46 is in optical communication with an optical input 48 of a Mach-Zehnder modulator 44. The fiber optic cable 46 presents an optical signal from a light source or laser (not shown) to the input 48. The optical signal is split into two equal signals by a Y-connection 50. RF electrodes 54 and 56 conduct RF signals supplied by a signal generator 52. While the split optical signals travel down waveguides 58 and 60, the electrical field of the RF signal modulates the split optical signals. The distance in which the RF signals interact with, or modulate, the split optical signals is known as the interaction distance, and is determined primarily by the modulator design.

A second Y-connection 62 combines the two split optical signals into a single, amplitude modulated optical signal. A fiber optic cable 64 which is connected to an optical output 66 of the modulator 44, presents the combined optical signal to subsequent stages (not shown) of an optical communication system.

The modulator 44 includes a substrate 68 which in one embodiment is made of X-cut lithium niobate ($LiNbO_3$) and is approximately 1000 microns ($\mu$m) thick. In another embodiment, the modulator 44 is made of Z-cut $LiNbO_3$. In order to maximize modulation, the waveguides lie between the electrodes for X-cut, while they are under the electrodes for Z-cut $LiNbO_3$. The length and width of the substrate 68 depend on the modulator design and must be sufficient to support the optical waveguides 58 and 60 and the RF electrodes 54 and 56. Other electro-optic materials can be used for the substrate 68 as well. In one embodiment, the optical waveguides 58 and 60 are positioned entirely within the substrate 68.

The waveguides 58 and 60 may be created by diffusing titanium into the substrate 68. In one embodiment, waveguides 58 and 60 are formed by creating a strip or channel (not shown) in the substrate 68, inserting titanium in the channel, and then raising the temperature of the substrate 68 so that the titanium diffuses into the substrate 68. In one embodiment, waveguides 58 and 60 are approximately seven (7) microns wide and approximately three (3) microns deep.

In one embodiment, the RF power electrodes 54 and 56 are formed from gold, but any conductive metal or metal alloy, such as silver or copper can be used. The RF electrodes 54 and 56 are formed using any of a number of known methods of adhering metal to substrate materials. In one embodiment, gold is deposited using electroplating or sputtering techniques. For example, a fifty (50) to eighty (80) Angstrom sublayer 70 of titanium may be deposited to improve the adhesion of the gold to the substrate 68.

The RF electrodes 54 and 56 are connected to an RF transmission line which delivers RF power from the signal generator 52. In one embodiment, the RF transmission line comprises a coaxial cable. The center RF electrode 56 is connected to the center conductor of the coaxial cable which is connected to the output of signal generator 52. The shield or outer conductor of the coaxial cable is electrically connected to electrodes 54. For Mach-Zehnder modulators, the thickness and width of the RF electrodes 54 and 56 are determined by the design of the modulator.

A dielectric buffer layer 76 with a dielectric constant E is situated between the RF electrodes 54 and 56 and the substrate 68. The substrate 68 has a dielectric constant which is higher than the dielectric constant $\epsilon$ of the buffer layer 76. RF electrodes 54 and 56 are electroplated over the dielectric buffer layer 76. The buffer layer 76 creates a medium for the RF signals that has substantially the same effective dielectric constant as the medium in which the optical signals travel. Thus, the velocity of the RF signals increases since the effective dielectric constant has been reduced, and the velocity of the RF signals are substantially matched to the velocity of the optical signals.

In one embodiment of the invention, the modulator includes a buffer layer 76 comprising a layer of Benzocyclobutene (BCB) 3022. BCB 3022 is a trade name for a polymer made by the Dow Chemical Company, and is widely used in multichip module (MCM) technology. BCB has superior thermal and electrical characteristics compared with conventionally used dielectric layer materials such as silicon dioxide ($SiO_2$). The microwave dielectric constant of BCB is only 2.7, in contrast to 3.9 for $SiO_2$. Furthermore, BCB is hydrophobic, absorbing less than 0.25% moisture after a 24-hour boil, while $SiO_2$ absorbs a few percent of moisture after a 24-hour boil because it is porous. Fabricating modulators with BCB requires only a small capital investment since only a spinner and an oven are required. In one embodiment, the BCB layer is approximately 8000 Angstroms thick. In another embodiment of the invention, the BCB layer is less than two microns thick.

Figure 4:
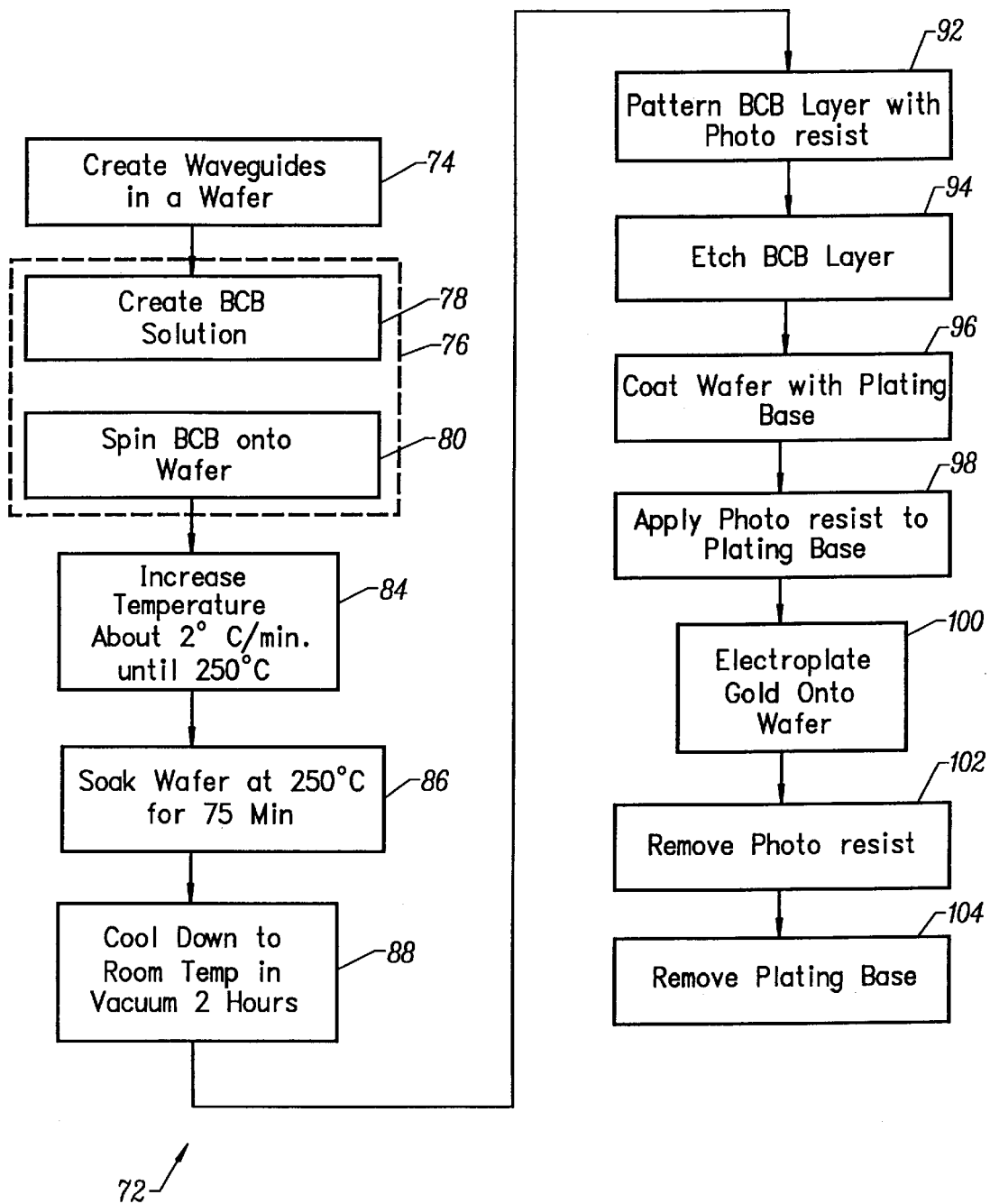
FIG. 4 is a flow chart illustrating a process for creating an optical device which uses BCB as a buffer layer in accordance with the present invention.
Figure 5:
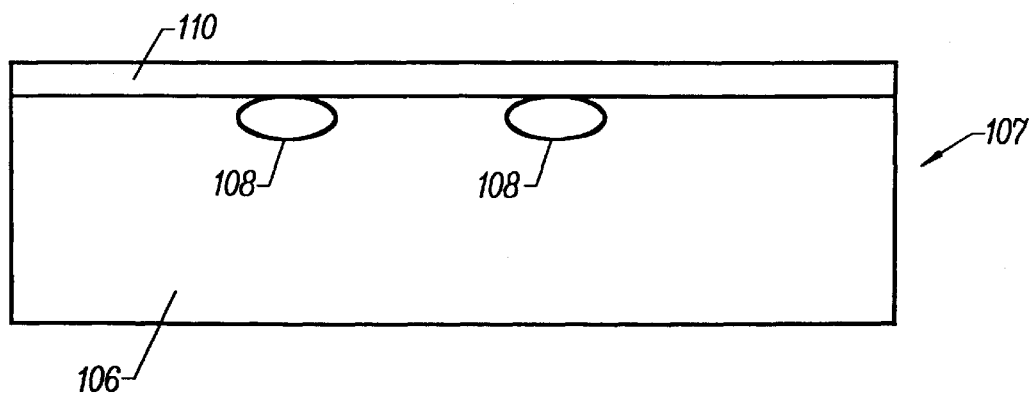
FIG. 5 is a simplified sectional illustration of a substrate after initial steps of the process of FIG. 4.

FIG. 4 illustrates a process for creating an optical device using BCB as a buffer layer. Step 74 illustrates the formation of optical waveguides 108 in a substrate material 106 of a wafer 107 through techniques known in the art, such as proton exchange or titanium in-diffusion. FIG. 5 is a simplified sectional illustration of a substrate after formation of the optical waveguides 108.

Step 78 illustrates the application of a BCB layer 110 to the wafer 107. Step 78 illustrates creating the BCB solution and step 80 illustrates spinning the BCB layer onto the wafer 107. A layer of BCB is typically applied to the wafer 107 by placing the wafer 107 and BCB in a spinner (not shown) which rotates at high speeds. Higher rotation speeds cause the BCB layer applied to the wafer to be thinner. In one embodiment of the invention, the BCB layer 110 is spun to approximately 8000 Angstroms according to the manufacturer's instructions.

After the BCB layer 110 is applied to the wafer 107, the wafer 107 is cured in a vacuum environment. Extra caution must be exercised when changing the temperature of a $LiNbO_3$ substrate, since $LiNbO_3$ is a pyroelectric material that is easily damaged by thermal shock. Step 84 illustrates an example of a step of increasing the temperature of the wafer 107 that will not damage the wafer by thermal shock. Step 84 illustrates increasing the temperature by about 2° Centigrade (°C.) per minute until the temperature is approximately 250° C. Numerous variations of step 84 are known in the art.

Step 86 illustrates a step of soaking the wafer at 250° C. for approximately 75 minutes. Step 88 illustrates an example of a step of cooling the wafer down to room temperature in vacuum that will not damage the wafer by thermal shock. The wafer is cooled to room temperature over a period of approximately two hours.

Figure 6:
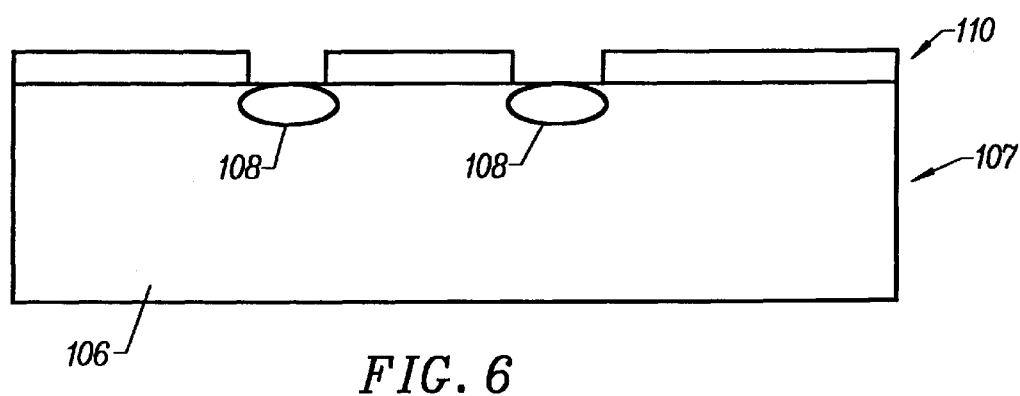
FIG. 6 is a simplified sectional illustration of a substrate after an etching step of the process of FIG. 4.

In one embodiment, the cured BCB layer 110 is left intact. In another embodiment, the cured BCB layer 110 on the wafer 107 is patterned and etched to isolate the electrodes. Step 92 illustrates patterning the cured BCB layer 110 on the wafer 107 with a photomask to isolate the electrodes. Step 94 illustrates etching the patterned BCB by techniques known in the art, such as plasma etching. For example, the BCB may be etched in a plasma etcher using a 9:1 mixture $O_2$ and $SF_6$ in an approximately 100 mtorr environment. The etching rate is on order of approximately 0.25 micrometers per minute. FIG. 6 illustrates the wafer 107 after etching.

Figure 7:
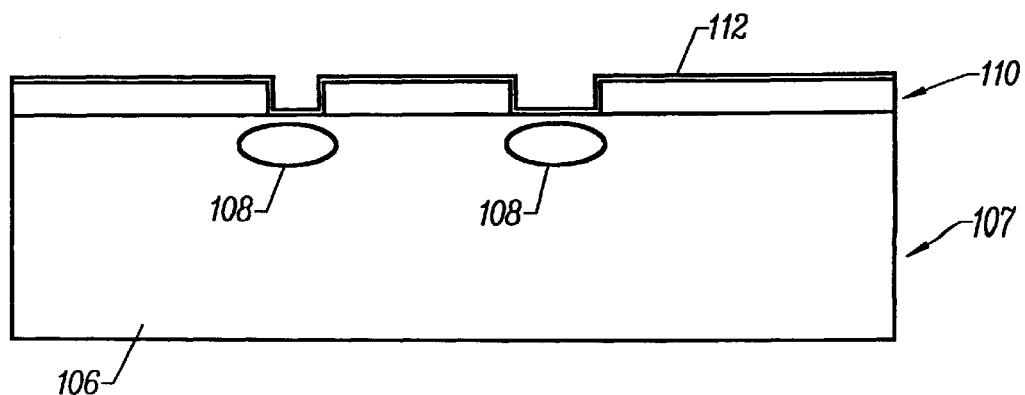
FIG. 7 is a simplified sectional illustration of a substrate after a plating base is applied in accordance with the process of FIG. 4.
Figure 8:
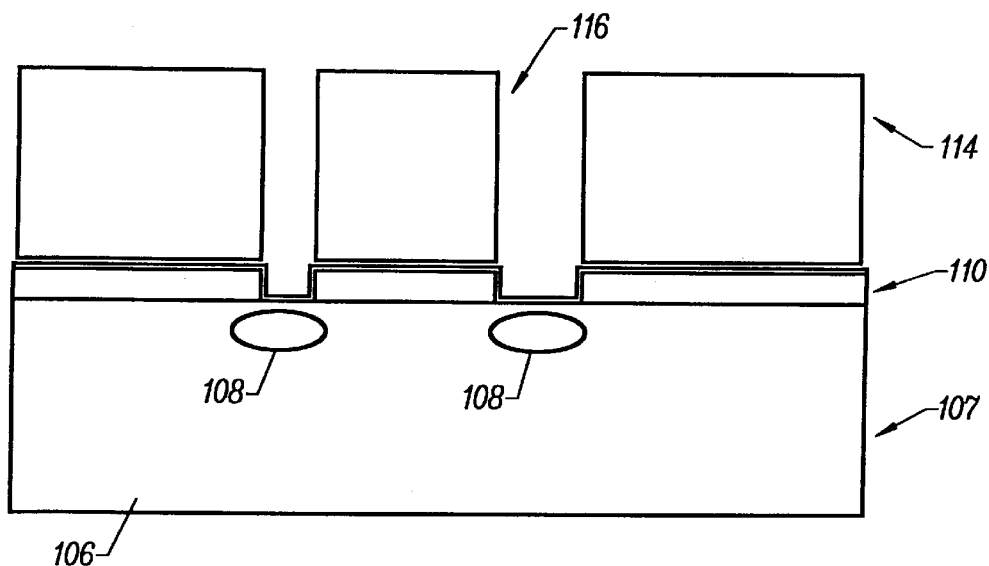
FIG. 8 is a simplified sectional illustration of a substrate after a layer of gold is applied in accordance with the process of FIG. 4.

Step 96 illustrates applying a plating base 112 to wafer 107 for electroplating. The plating base 112 comprises a thin metal film, which in one embodiment, is approximately a 200 Angstrom layer of titanium/tungsten (Ti/W) and a 100 Angstrom layer of gold. In one embodiment, the plating base is deposited using a sputtering system. To solve the interface adhesion problem between the BCB layer 110 and the thin metal film, the BCB layer 110 is back sputtered with argon plasma to roughen the surface of the BCB layer. FIG. 7 shows the wafer 107 after the plating base 112 is applied.

Figure 9:
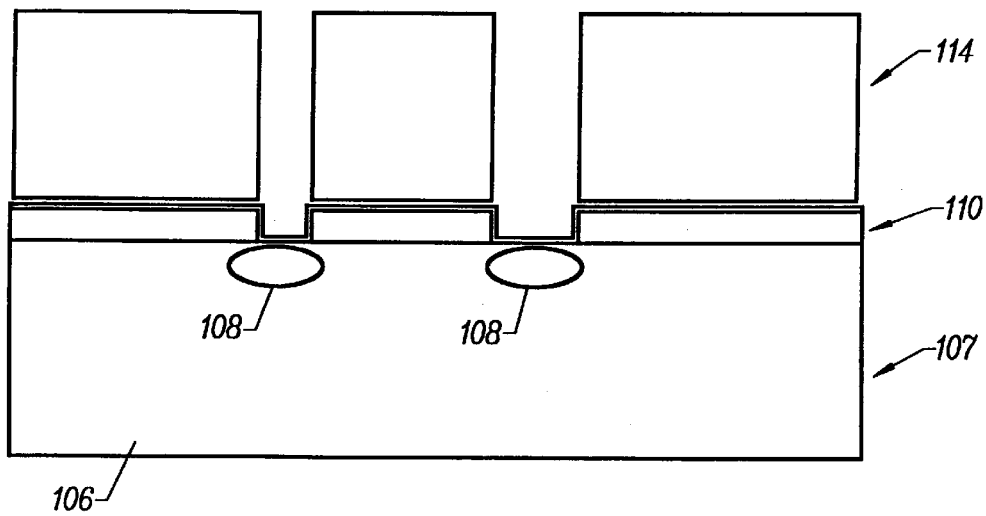
FIG. 9 is a simplified sectional illustration of a substrate after a plating base is removed in accordance with the process of FIG. 4.

Step 98 illustrates applying a thick photoresist layer, typically between 10 and 30 micrometers thick, to the plating base 112 in preparation for electroplating. Step 100 illustrates electroplating thick gold onto the wafer. The photoresist layer defines the shape of a gold layer 114 to be electroplated to the wafer 107. The photolithography is performed to make the cavity walls 116 as close to vertical as possible. The thick gold layer 114 propagates a microwave signal that modulates the optical signals in the optical waveguides 108, as described above. After electroplating, the photoresist is removed, as shown by step 102, and then the plating base is removed, as shown by step 104. FIG. 9 illustrates the wafer 107 after the plating base is removed.

Another aspect of the present invention relates to an improved method for fabricating integrated optical devices from Z-cut $LiNbO_3$. Z-cut $LiNbO_3$ modulators offer improved modulation efficiency in comparison to X-cut $LiNbO_3$ modulators because such modulators have higher overlap between the applied electric field and the optical mode when conditions of velocity and impedance matching are achieved. The higher overlap results in improved modulation efficiency. Such modulators are useful for high-speed telecommunications systems.

Figure 10:
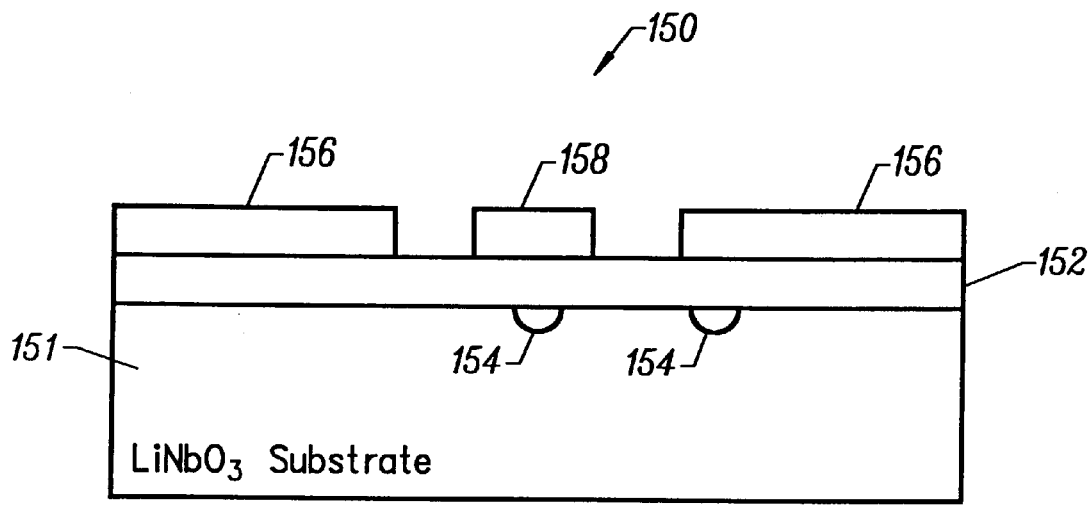
FIG. 10 illustrates a cross-section of an optical device that includes a buffer layer according to the present invention that reduces DC drift.

FIG. 10 illustrates a cross-section of an optical device 150 that includes a polymer buffer layer 152 that reduces DC drift according to the present invention. In one embodiment of the present invention, the optical device 150 is formed from a Z-cut $LiNbO_3$ substrate 151 and is suitable for high-speed applications. Waveguides 154 are formed in the $LiNbO_3$ substrate 151 as described above. A conductive polymer buffer layer 152 is formed on top of the $LiNbO_3$ substrate 151 as described above. Ground electrodes 156 and hot electrode 158 are also formed as described above.

The conductive buffer layer 152 shown in FIG. 10 performs two functions. First the buffer layer 152 increases the velocity of the microwave signal because the dielectric constant of the buffer layer is less than the dielectric constant of the $LiNbO_3$ substrate 151. This reduces velocity mismatch between the microwave signal and the optical signal in a traveling wave modulator. Second the buffer layer 152 bleeds off unwanted charges and thus reduces DC drift. Reducing DC drift is particularly important for Z-cut $LiNbO_3$ as described above.

The conductivity of the buffer layer is selected to meet two simultaneous requirements. First, the conductivity must be low enough to prevent excessive optical loss. Second, the conductivity must high enough to reduce DC drift to an acceptable level. Some polymers are conductive and other polymers can be made conductive by numerous techniques known in the art. One technique includes altering the material properties of the polymer to increase electrical conductivity. Another technique includes adding at least one substance that increases conductivity. As described above, the device of FIG. 10 is relatively inexpensive to manufacture because the conductive polymer buffer layer can be fabricated by a spin coating process, which is much less expensive compared to the cost of a CVD or sputtering processes.

Figure 11:
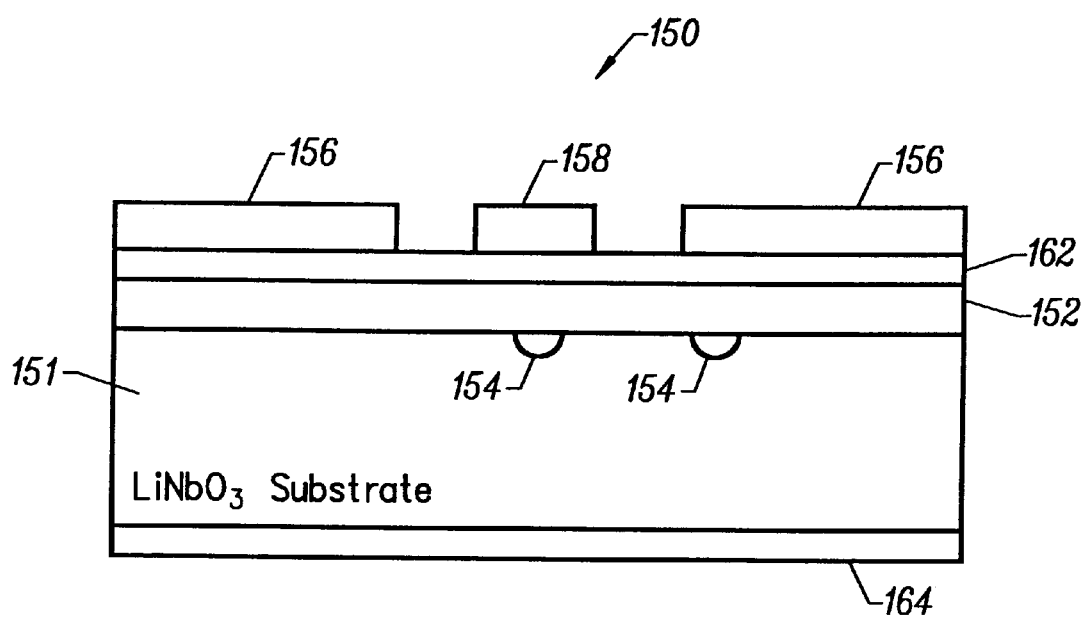
FIG. 11 illustrates a cross-section of an optical device that includes a polymer buffer layer and a charge bleed off layer according to the present invention that simultaneously reduces DC drift and bleeds off the pyroelectric charge.

FIG. 11 illustrates a cross-section of an optical device 160 that includes a polymer buffer layer 152 and a charge bleed-off layer 162 according to the present invention that simultaneously reduces DC drift and bleeds off pyroelectric charge. In one embodiment of the present invention, the optical device 160 is formed from a Z-cut $LiNbO_3$ substrate 151 and is suitable for high-speed applications. Waveguides 154 are formed in the $LiNbO_3$ substrate 151 as described above.

The polymer buffer layer 152 is formed directly on top of the $LiNbO_3$ substrate as described above. The polymer buffer layer 152 may be conductive or slightly conductive as described in connection with FIG. 10. The charge bleed-off layer 162 is formed on top of the polymer buffer layer 152. Ground electrodes 156 and hot electrode 158 are also formed on top of the buffer layer as described above. A conductive layer 164 may be formed on a bottom surface 166 of the substrate 151.

The charge bleed-off layer 162 comprises a conductive film. Numerous types of conductive films known in the art may be used. For example, the charge bleed-off layer 162 may be a metal oxide, a semiconductor like amorphous silicon, or a conductive polymer. The thickness and conductivity of the charge bleed-off layer are selected to prevent significant RF current from traveling through it. In one embodiment of the present invention, the charge bleed-off layer 162 is several hundred Angstroms thick.

Figure 12:
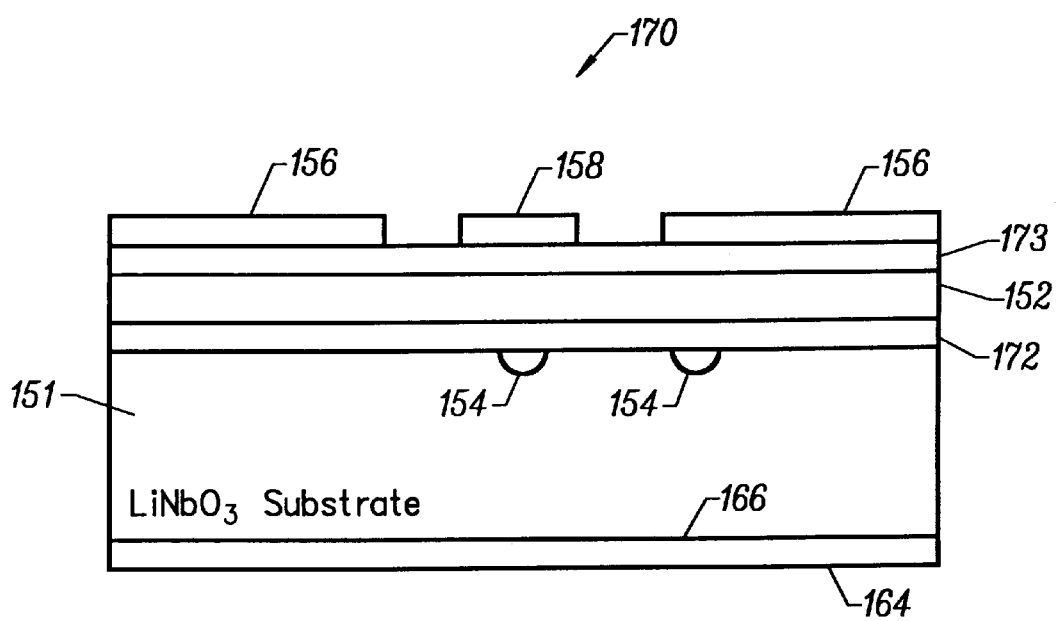
FIG. 12 illustrates a cross-section of an optical device that includes a polymer buffer layer and a semiconductor charge bleed-off layer according to the present invention that simultaneously reduces DC drift and bleeds off pyroelectric charge.

FIG. 12 illustrates a cross-section of an optical device 170 that includes a polymer buffer layer 152 and a semiconductor charge bleed-off layer 172 according to the present invention that simultaneously reduces DC drift and bleeds off pyroelectric charge. In one embodiment of the present invention, the optical device 170 is formed from a Z-cut $LiNbO_3$ substrate 151 and is suitable for high-speed applications. Waveguides 154 are formed in the $LiNbO_3$ substrate as described above.

The semiconductor charge bleed-off layer 172 is formed directly on the $LiNbO_3$ substrate. In one embodiment of the invention, the semiconductor bleed-off layer 172 comprises a silicon (Si) layer. Using a silicon charge bleed-off layer is advantageous because it simplifies the fabrication process. It is relatively easy to evaporate silicon by electron beam evaporation.

The polymer buffer layer 152 is formed on top of the semiconductor charge bleed-off layer 172 as described in connection above. In one embodiment, the polymer buffer layer 152 is slightly conductive as described in connection with FIG. 10 to reduce DC drift. In another embodiment of the invention, a second charge bleed-off layer 173 is deposited on top of the polymer buffer layer 152. The second charge bleed-off layer 173 may be a semiconductor charge bleed-off layer or a metal oxide charge bleed-off layer. Ground electrodes 156 and hot electrode 158 are also formed on top of the buffer layer as described above. A conductive layer 164 may be formed on a bottom surface 166 of the substrate 151.

The optical device of FIG. 12 has numerous advantages over the prior art. Using a silicon bleed-off layer is advantageous because it simplifies the fabrication process and reduces the cost to manufacture the device as described above. The technology for depositing amorphous silicon is well known in the art. Another advantage of the optical device of FIG. 12 is that constructing an optical device with a buffer layer on top of a semiconductor bleed-off layer reduces the diffusion of electrode metal into the charge bleed off layer. The device of FIG. 12 has been shown to have relatively low optical loss notwithstanding the fact that most semiconductor layers have a high optical refractive index and modest optical absorption.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An electro-optic device comprising:
   a) a lithium niobate substrate including an optical waveguide formed in an upper surface thereof;
   b) a buffer layer comprising BCB dielectric material formed directly on the upper surface of the lithium niobate substrate, the buffer layer having a thickness of less than one micron; and
   c) an electrode formed on an upper surface of the buffer layer that is positioned to receive an RF signal, the RF signal inducing an electrical field in the optical waveguide.

2. The device of claim 1 wherein the electro-optic device comprises a Mach-Zehnder interferometer.

3. The device of claim 1 further comprising an interface layer formed between the buffer layer and the electrode, the interface layer improving the adhesion of the electrode to the buffer layer.

4. The device of claim 3 wherein the interface layer comprises a roughened upper surface of the buffer layer.

5. The device of claim 3 further comprising a plating base formed on the buffer layer.

6. The device of claim 3 wherein the plating base comprises a titanium/tungsten layer.

7. The device of claim 6 wherein the electrode comprises electroplated metal formed on the plating base.

8. The device of claim 1 wherein the lithium niobate substrate comprises Z-cut lithium niobate.

9. The device of claim 1 wherein the BCB dielectric material has a conductivity that reduces DC drift.

10. The device of claim 1 further comprising a charge bleed-off layer that is formed between the buffer layer and the electrode, the charge bleed-off layer bleeding off pyroelectric charge.

11. The device of claim 10 wherein the charge bleed-off layer comprises a metal oxide film.

12. The device of claim 10 wherein the charge bleed-off layer comprises a conductive polymer film.

13. An electro-optic device that simultaneously reduces DC drift and bleeds off pyroelectric charge, the device comprising:
   a) a Z-cut lithium niobate substrate including an optical waveguide formed in an upper surface thereof;
   b) a buffer layer comprising BCB dielectric material formed directly on the upper surface of the lithium niobate substrate;
   c) a conductive charge bleed-off layer formed on an upper surface of the buffer layer; and
   d) an electrode formed on an upper surface of the charge bleed-off layer that is positioned to receive an RF signal, the RF signal inducing an electrical field in the optical waveguide.

14. The device of claim 13 wherein the buffer layer has a thickness of less than one micron.

15. The device of claim 13 wherein the charge bleed-off layer comprises a metal oxide film.

16. The device of claim 13 wherein the charge bleed-off layer comprises a conductive polymer film.

17. The device of claim 13 wherein the BCB dielectric material is conductive.

18. The device of claim 13 further comprising a conductive layer formed on a bottom surface of the substrate.

19. An electro-optic device that simultaneously reduces DC drift and bleeds off pyroelectric charge, the device comprising:
   a) a Z-cut lithium niobate substrate including an optical waveguide formed in an upper surface thereof;
   b) a semiconductor charge bleed-off layer that is formed directly on the upper surface of the Z-cut lithium niobate substrate, the charge bleed-off layer bleeding off pyroelectric charge;
   c) a buffer layer comprising BCB dielectric material formed on an upper surface of the semiconductor charge bleed-off layer; and
   d) an electrode formed on an upper surface of the buffer layer that is positioned to receive an RF signal, the RF signal inducing an electrical field in the optical waveguide.

20. The device of claim 19 wherein the buffer layer has a thickness of less than one micron.

21. The device of claim 19 wherein the semiconductor comprises silicon or amorphous silicon.

22. The device of claim 19 wherein the BCB dielectric material is conductive.

23. The device of claim 19 further comprising a conductive layer formed on a bottom surface of the substrate.

* * * * *